June 14, 1966 — A. W. HAYDON — 3,256,453
SYNCHRONOUS MOTORS
Filed Aug. 27, 1962 — 3 Sheets-Sheet 1
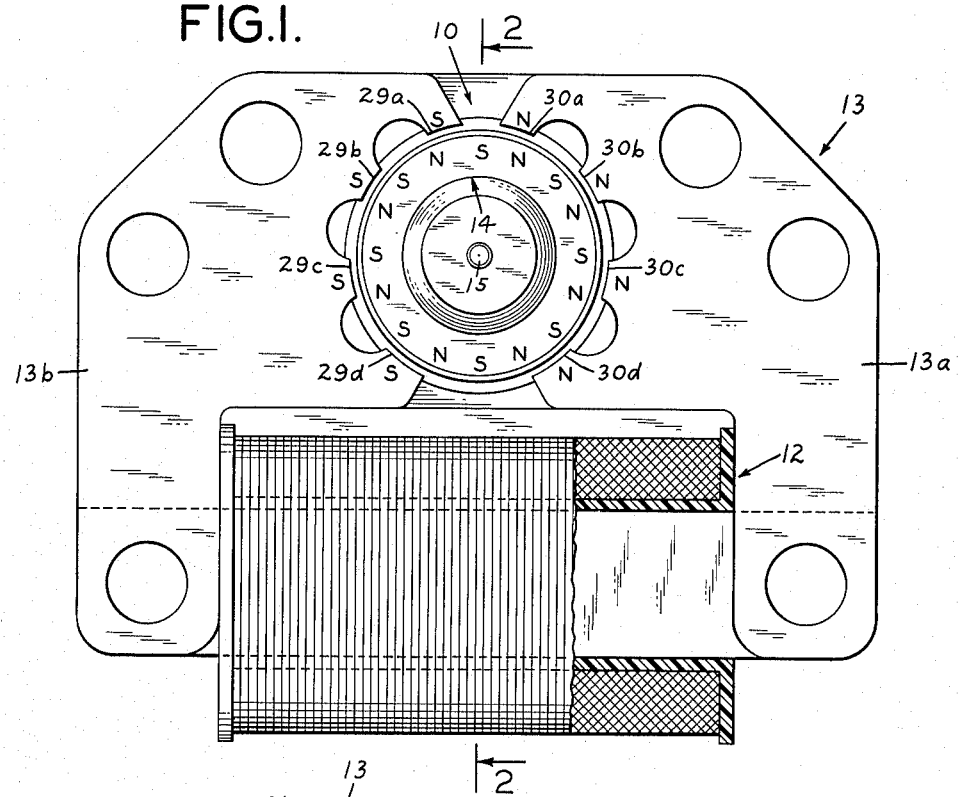
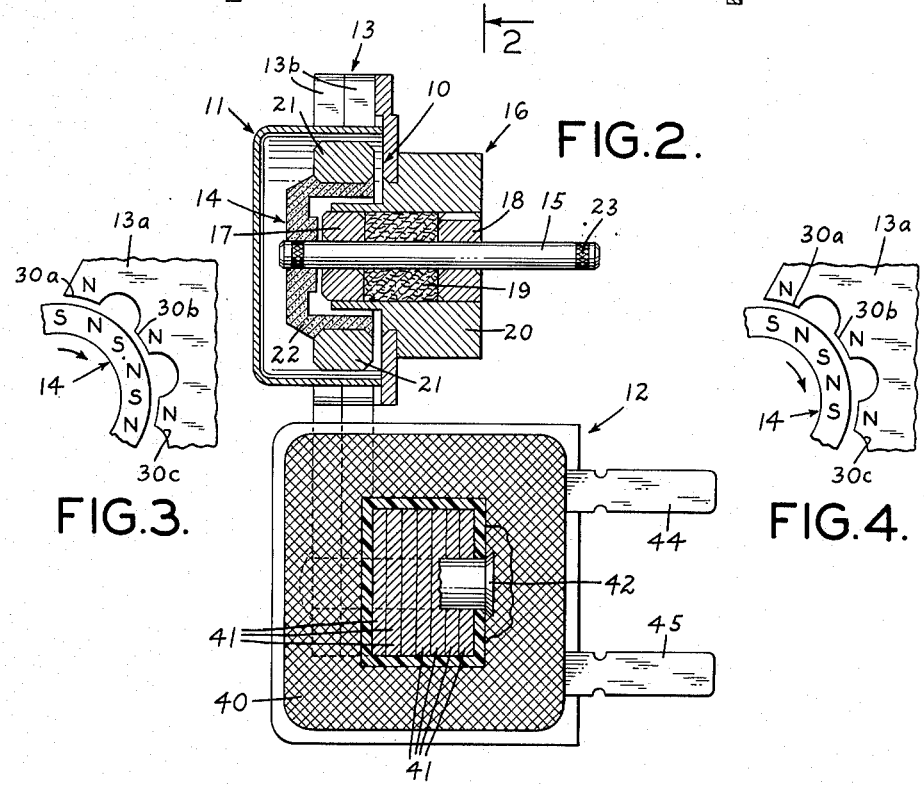

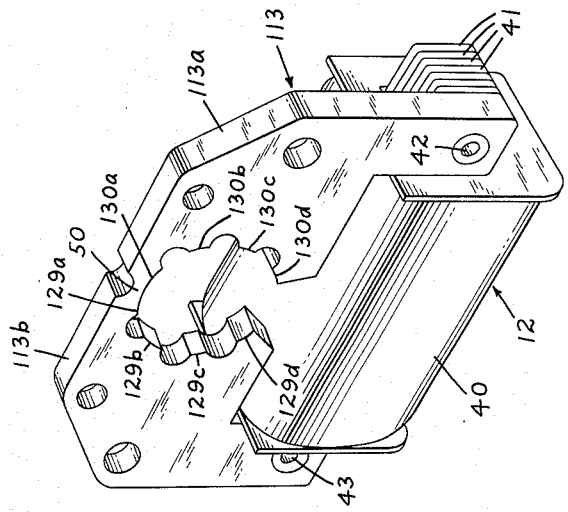
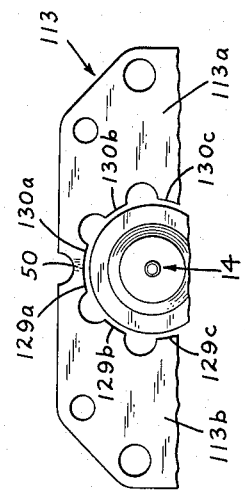
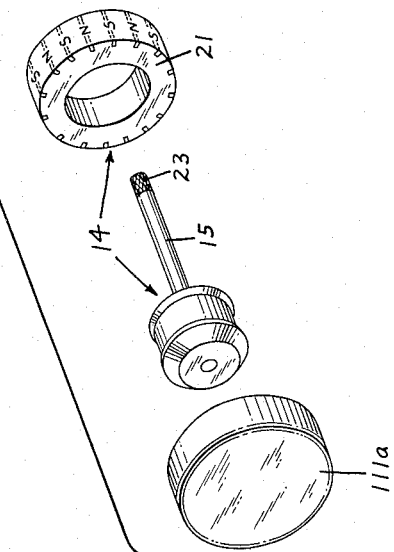

United States Patent Office 3,256,453
Patented June 14, 1966

1

3,256,453
SYNCHRONOUS MOTORS
Arthur W. Haydon, Milford, Conn., assignor to Consolidated Electronics Industries Corp., Waterbury, Conn., a corporation of Delaware
Filed Aug. 27, 1962, Ser. No. 219,429
9 Claims. (Cl. 310—156)

This invention relates to electric rotating machines and is particularly applicable to self-starting, synchronous, alternating current motors.

The invention is especially useful in self-starting, synchronous motors operable from single-phase alternating current, employing a permanently magnetized rotor.

One of the problems existing in the motor art heretofore has been that of providing an inexpensive synchronous motor which is self-starting. A related problem is the provision of such a motor suitable for use in clocks and generally similar applications. For such applications quiet running characteristics and reliable long life in the operation of the motor are important advantages. In efforts directed towards these ends, the prior art has been confronted with the critical problem of minimizing axial thrust forces created during rotation of the rotor by undesired components of torque which tend to cause noisy operation of the motor and severely increase wear on its bearings.

Still another problem is that in relatively inexpensive motors, if a portion of the motor wears out or ceases to operate satisfactorily, it has typically been necessary to replace the entire motor, because the expense of repairing it was not justified in view of the fact that that expense was so large in relation to the cost of the motor itself. One of the objects of the present invention is to provide an inexpensive alternating current motor which is self-starting with a high degree of reliability, and which is readily adaptable for the replacement of those parts which are most likely to need replacement after a period of time.

In certain embodiments of the invention there is provided a self-starting alternating current motor adapted to be operated from single-phase current, employing a stator and a rotor assembly adapted for ready removal and replacement in the stator, the rotor comprising a cylindrical member of ferrite material magnetized to have a plurality of alternate north and south pole regions disposed around its periphery, and a stator especially designed to coact with the rotor to cause the quiescent position of the rotor to be a favorable one for producing self-starting action.

The quiescent position of the rotor depends upon the reluctance of the various paths presented to the rotor, when the rotor is at various angular positions and the stator is de-energized.

In one embodiment of the invention, the stator is formed of laminated sections and is generally C-shaped, including a back portion around which there is provided an energizing coil, and a pair of arms which approach each other and between the ends of which there is mounted a rotor with its longitudinal axis perpendicular to the plane of the stator "C." The ends of the arms of the stator terminate in a plurality of pole faces. These pole faces comprise a first group on one arm, arranged to embrace the rotor assembly partially on one side through

2 an arc of slightly less than 180 degrees, and a corresponding group of stator pole faces on the other arm, arranged to embrace the rotor assembly partially through a corresponding arc on its opposite side. At a given moment, when the stator is energized, one group of the stator pole faces on one arm will comprise north poles, and the group on the other arm will comprise south poles. The rotor and stator are so designed, that when the stator is de-energized, the quiescent position of the rotor will be one in which pairs of its poles of opposite polarity are offset from and straddle individual ones of the stator pole faces. The configuration of the stator, particularly when it is generally C-shaped, is such as to discourage the rotor from assuming a quiescent position where individual rotor poles are centered directly opposite individual stator poles but instead consistently favors a stopping position of the rotor where its poles are offset by approximately 90 electrical degrees (one-fourth the annular distance between one rotor pole and the next of like polarity) from the first-mentioned position. This effect is enhanced by the design of the ferrite rotor which, being of low permeability, provides a ready flux path from one rotor pole to its adjacent pole of opposite magnetic polarity, but does not provide a low reluctance flux path across its diameter.

By design, the paths of the rotor and stator fluxes are confined to planes perpendicular to the rotor shaft; thus no or negligible components of torque are produced in an axial direction. This feature results in a motor which is extremely quiet-running in operation and exhibits extended life in service as the tendency for the rotor shaft to oscillate back and forth in its bearing supports is greatly minimized.

Further, in some embodiments, the rotor is protected from fouling through the entry of ferrous metal chips from the stator by enclosing it in a cover housing which is of non-magnetic material so as to leave the preferred flux paths of minimum reluctance required for the starting of the motor unchanged.

The foregoing and other objects, features and advantages of the invention will be apparent from the following more particular description of preferred embodiments of the invention, as illustrated in the accompanying drawings.

FIG. 1 is a plan view, partially fragmentary, of an embodiment of a motor according to the present invention, with the cover piece removed for purposes of clarity.

FIG. 2 is a sectional view of the embodiment of FIGURE 1 taken along the line 2—2 the sectional plane passing through the vertical axis of symmetry of the motor.

FIG. 3 is an enlargement of a portion of the motor shown in FIGURE 1 illustrating the magnetic conditions present in the quiescent position of the rotor.

FIG. 4 is a view similar to that of FIGURE 3 illustrating typical magnetic conditions during starting of the motor after the rotor has advanced somewhat.

FIG. 6 is an exploded perspective view of another embodiment of a motor according to the present invention which differs from the one shown in the preceding figures in that the stator piece is of unitary construction (not laminated) and the two groups of stator pole faces carried on respective arms of the stator are bridged at the top thereof by an integral portion of the stator.

FIG. 7 is a plan view of a portion of the embodiment shown in FIGURE 6, with the cover housing removed for purposes of clarity.

Figure 5:
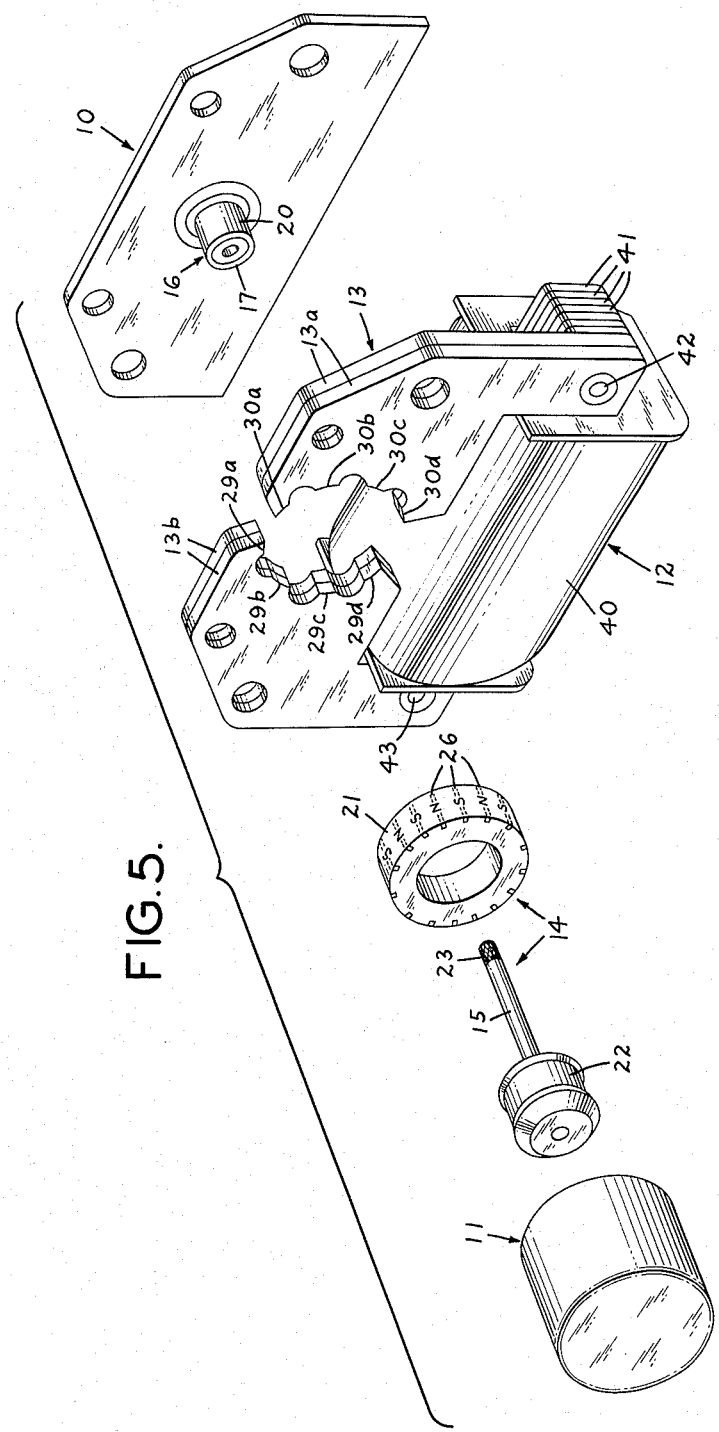
FIG. 5 is an exploded perspective view of the embodiment of FIGURES 1 and 2 illustratiing the relationship of principal components of the motor.

In many cases motors are required which will reliably operate for long periods of time in a sealed or inaccessible unit where maintenance is impossible. Especially under such circumstances, simplicity of construction may tend to increase reliability, because additional motor parts are often additional potential sources of failure. In some applications, as in air-borne or space vehicles for example, it is desirable to reduce the total weight and size of the motor, and to reduce the number of parts.

Also, in some cases motors are required for use in devices which are intended to be discarded and replaced, after a period of time, rather than repaired. Because every additional part usually represents an added element of cost, it is desirable in such motors to minimize the total number of parts.

In one embodiment of a motor according to the present invention, there is provided a cylindrical rotor including a ring-shaped member of ferrite material magnetized in localized regions so as to include pairs of non-salient magnetic poles uniformly spaced about its axis of rotation, adjacent poles being of opposite magnetic polarity. The stator member is formed from a plurality of laminated metal stampings and includes two groups of salient pole faces respectively disposed on opposite sides of the rotor. As will be more fully explained, at any instant of time all the pole faces of a given group are of the same magnetic polarity while those of the other group are of opposite magnetic polarity, i.e., the poles of the second group differ by 180 electrical degrees (or an odd multiple thereof) from the poles of the first group. The two groups of salient stator poles are each carried on respective arms of the stator assembly which approach each other with the rotor centered in between. These two groups together do not totally embrace the circumference of the rotor but rather partially embrace the rotor on opposite sides with respective arcs somewhat less than 180 degrees.

Where conditions of running torque are important, there are advantages in using the largest possible total circumferential area of overlap between the salient stator poles and the rotor magnet. However, this overlap cannot be entire, i.e. 360 degrees, since there must exist, in motors of the present invention, an air gap between the two respective groups of stator poles in order for their magnetic orientations to differ. Further, this air gap between the two respective groups of stator poles must be of sufficient circumferential arc so as to present a path of relatively high reluctance to the flow of magnetic flux as compared to the air gap existing between the rotor and the individual stator pole faces. It is to be understood that, in place of an air gap between the two respective groups of stator poles, a connecting link of ferromagnetic, nonmagnetic, or other material may be utilized as an equivalent if the linking material either readily saturates with magnetic flux or otherwise presents a high reluctance path.

Maximum torque may be obtained when the number of stator poles equals the number of pole pairs appearing at the surface of the rotor magnet. Thus in one illustration, for a 450 r.p.m. motor, the rotor may include 16 magnetized regions [8 north and 8 south poles]. Eight salient stator poles arranged in two groups of 4 may be arranged around the rotor, spaced apart at intervals of 45 mechanical degrees, except that the spacing between the two groups of 4 poles should be 45 ±45/2 mechanical degrees since the two groups are of differing magnetic polarity. From the viewpoint that the distance between one north pole on the rotor, for example, to the next north pole corresponds to 360 electrical degrees, the spacing between individual stator poles in the same group may be described as corresponding to 360 electrical degrees, while the spacing between individual stator poles in different groups may be described as corresponding to an odd multiple of 180 electrical degrees in this illustration. In some cases, the spacing between individual stator poles of the same group may correspond to [N] [360] electrical degrees, where [N] is an integer, and the spacing stator poles of different groups may correspond to [N] [360] ±180 electrical degrees.

The stator is energized by a coil from an alternating current supply. When the motor is turned off, thus de-energizing the stator, the rotor consistently stops in a position where the rotor poles are displaced approximately 90 electrical degrees from individual stator poles, as stated. That is, the rotor stops with pairs of its oppositely polarized regions uniformly straddling individual stator poles. Hence each stator pole bridges the space between a pair of adjacent rotor poles of opposite polarity, the stator pole being approximately centered in that space. The term "quiescent position" is used in the present application to refer to the position assumed by the rotor when the stator is de-energized. An important advantage of the quiescent position described above, offset 90 electrical degrees from a rotor position where similar rotor poles would be centered directly opposite the stator poles, is that when the stator is again energized, the motor is self-starting. Furthermore, this rotor position is an exceptionally good one from the standpoint of producing good starting torque. This is an extremely desirable feature.

For causing the rotor to assume this preferred quiescent position, the stator and rotor are so constructed, that when no current is flowing through the energizing coil, the reluctance of the magnetic path between a pair of rotor poles of opposite polarity, from one rotor pole across a stator pole (circumferentally), to a rotor pole of opposite polarity and thence back along the periphery of the rotor to the first pole, is less than the reluctance of the path from one rotor pole to a stator pole, thence through the stator structure to another stator pole, then to a rotor pole of opposite polarity, and then back through the rotor to the first mentioned rotor pole.

When the stator is de-energized, the rotor will seek a stopping position where its own magnetic poles find the lowest reluctance path. Because of the reluctance relationships just stated, the rotor in the motors of the present invention will consistently stop in the preferred starting position which has been described, this being the position where the lowest reluctance path for the rotor flux exists. This relationship depends not only on the construction of the stator, including its poles and the other associated members in the magnetic circuit therewith, but also depends in part on the fact that the rotor magnet material employed has a high reluctance, with a magnetic permeability approaching that of air, and also has a high coercive force characteristic which causes it to hold its position of magnetization physically fixed. By reason of its inherent high reluctance, the preferred flux path is around the periphery of the rotor from pole regions to adjacent pole regions rather than through the rotor material itself across a diameter thereof. This rotor material, in a preferred embodiment, comprises barium ferrite.

Thus the construction of the stator and of the rotor, their physical configuration, their magnetic properties (reluctance), and their interrelationship aid in causing the rotor consistently to assume the quiescent position desired herein and to start reliably when the stator poles are energized.

Although the embodiments of the invention shown herein illustrate a motor having two groups of stator poles disposed on opposite sides of a rotor, the invention is not, in its broadest aspect, limited to such an arrangement. For example, in some more complex motors employing the principles of the present invention, more than one pair of stator pole groupings may be employed, such as an arrangement of four such groups of stator poles in respective quadrants of a circle and embracing a rotor centered therein, with the stator poles of adjacent groups differing in their spacing by an odd multiple of 180 electrical degrees. Also, it is not a requisite for the satisfactory operation of motors according to the present invention that the number of stator poles in one group be identical to that of another group. Hence, it should be understood that the motors shown in the attached drawings are only illustrative of a broad class of motors which may utilize the teaching of the present invention, and a wide variety of other arrangements are possible, representing elaborations on and modifications of the basic form of the motors shown and disclosed herein.

One embodiment of the invention is shown in FIGURES 1, 2 and 5 of the drawing. In this form, the motor comprises a stator housing including a mounting plate 10, a cover 11, a field coil assembly 12, a stator structure 13, and a rotor 14. As shown, the rotor is mounted on a shaft 15 and supported for rotation in a bearing assembly 16 centered in a mounting plate 10 of a nonmagnetic material such as aluminum. The mounting plate 10 is secured to stator 13 by suitable fastening means such as by welding, riveting, etc. Any suitable bearing assembly may be used to support the rotor 14. In this illustrative form, the bearing assembly shown comprises an aluminum core piece 20, sintered bronze sleeve bearings 17 and 18, and a lubricating wick 19 supported inside the core.

The removable rotor assembly 14 comprises an annular member 21 which has a plurality of permanently magnetized regions on its peripheral surface. The annular member 21 is supported on a hub piece 22 which is attached to shaft 15 having a knurled end 23 for the mounting of a drive pinion gear or the like (not shown). The hub may be comprised of any light-weight material of suitable strength, such as thermosetting plastic or aluminum. As shown, the hub 22, of aluminum in this illustration, is hollowed out on one side to minimize rotating mass.

The permanent magnet member 21 may be secured to the rotor by a variety of techniques, for example, as by cementing with a suitable bonding material, such as one of the epoxy, thermosetting, or thermoplastic type, or by die casting.

The stator structure 13 comprises in this illustrative embodiment a pair of right angular arms 13a and 13b, which are made from laminated stampings and joined together at their respective vertical legs by straight-edge 41 made from a plurality of laminated sections to form an overall C-shaped configuration for the stator. The arm members 13a and 13b and the straight edge portion 41 which forms the back portion of the stator structure are composed of a metallic material, for example, low carbon or mild silicon steel, of relatively high permeability, so as to form a low reluctance path for magnetic flux. The laminations forming the straight edge portion 41 are secured together and to the legs of respective stator arms 13a and 13b by suitable fastening means, such as eyelet rivets 42 and 43, which also serve to hold the laminated sections of the stator arms together. The stator structure might also be satisfactorily comprised by laminated single sections of C-shaped configuration rather than the three separate pieces (two arms and a straight edge portion) shown; however, for ease of assembly and repair of the motor components, the segmented fabrication of the stator structure is preferred. Encircling the straight-edge or back portion 41 of the stator structure is a bobbin wound coil 40 which is energized from a suitable source of alternating current potential (not shown) connected to coil terminals 44 and 45. The stator laminations, which typically are formed from metal stampings and are insulated from one another by oxide scale, lacquer, or the like, are utilized in the stator structure to reduce eddy current and hysteresis losses which degrade the efficiency of the motor and cause it to heat up during operation.

The stator arms 13a and 13b each terminate at their horizontal leg portions in a plurality of respective pole faces 29a . . . 29d and 30a . . . 30d. In the illustrative embodiment shown in FIGURE 1, stator arm 13a terminates in a group of four pole faces each spaced 45 mechanical degrees apart about a circular arc somewhat less than 180 degrees. Stator arm 13b terminates in a similar group of four pole faces which are symmetrical to their respective counterparts on stator arm 13a about the vertical axis of the stator, shown in FIGURE 1 as line 2—2; that is, stator arms 13a and 13b are mirror images of each other.

Centered inside the circular arc described by the pole faces 29a . . . 29d and 30a . . . 30d is the rotor assembly 14. The diameter of the rotor magnet 21 is such as to provide a small air gap between the rotor and stator poles to permit rotation and the desired magnetic interaction between the fluxes of the stator poles and the rotor poles when the motor is energized.

As is best shown in FIGURES 2 and 5, a cylindrical cover piece 11, fabricated of a nonmagnetic material such as aluminum, extends into the air gap between the rotor magnet 21 and the respective pole groups 29 and 30. The cover piece serves to enclose and protect the rotor assembly from the entry of dirt and ferrous metal chips from the stator structure 13. The use of a cover housing of nonmagnetic material, i.e. having a permeability approximately equal to that of air, leaves the flux paths between the stator and the rotor undisturbed notwithstanding the presence of the cover 11 in the air gap between the stator and the rotor. Similarly, the use of a nonmagnetic material for the mounting plate 10, which supports the bearing assembly 16, does not alter or otherwise affect the flow of magnetic flux between the respective stator arms 13a and 13b. In other words, these two last named elements (the cover 11 and the mounting plate 10) serve mechanical functions only and do not divert any substantial portion of the magnetic flux from the preferred magnetic circuit of the motor. The rotor magnet material 21 in a preferred embodiment comprises a magnetic material of high coercivity, low permeability, and a relatively low specific gravity. A satisfactory material for this purpose is a barium ferrite material, which is ceramic in nature and commercially available, for example, as "Magnadure" from the Ferroxcube Corporation of America. This material is magnetically "hard," having a very high value of coercivity, approximately 1600 oersteds. Its specific gravity is about 4.5, and its permeability is approximately equal to that of air.

The rotor material, being magnetically hard, enables the placing of poles of opposite polarity very close to each other on the periphery of the rotor to form a nonsalient pole type rotor and the magnetic field intensity established by these poles does not deteriorate materially during operation or with age.

As indicated schematically in FIGURE 1, pairs of poles of the rotor are induced in the periphery of the rotor magnetic material. In this particular embodiment there are sixteen poles (eight pole pairs) uniformly spaced about the axis of rotation. Adjacent poles at the surface of the rotor are of opposite polarity. The direction of magnetization in this illustration is predominantly radial—that is, perpendicular to the axis of rotation. For purposes of illustration, FIGURE 5 shows in dotted outline the approximate regions of the rotor material which acquire a particular magnetic orientation to form poles and these have been arbitrarily designated N and S (identified by numeral 26) to indicate north and south poles. As may be seen in this figure, the shape of the magnetized regions is such that these regions extend the length of the rotor and parallel thereto, in this illustrative motor. In some embodiments it may be desirable to skew the magnetized regions along the length of the rotor, rather than parallel as shown, in order to reduce ripples in the running torque. In general, the individual magnetic poles are relatively wide, separated by relatively thin regions having little or no magnetism.

In the process of permanently magnetizing the rotor member, a relatively high unidirectional current flowing in a suitable shaped coil is used to provide the magnetizing force necessary to induce the poles in this material. The high coercivity characteristic of the material insures that the magnetized regions induced in the rotor are permanent. They are undisturbed by operating stator flux fields, even though a motor may be overexcited by several hundred percent, and do not deteriorate materially with age.

FIG. 1 shows the relative positions of the rotor 14 and the two groups of stator poles 29a . . . 29d and 30a . . . 30d with no voltage applied to the field coil 12. The rotor magnetic poles in each pair are displaced 90 electrical degrees from the center of the adjacent stator pole. This represents the quiescent position of minimum reluctance which the rotor will always seek and assume when field power is interrupted.

Hence, it may be seen that in the motor of this embodiment the field poles of a given group have uniform center to center angular spacings equal to 360 electrical degrees.

This spacing may alternatively be an integral multiple of 360 electrical degrees in which case for a motor such as that of FIGURE 1 there would be fewer salient poles in a group and net torque would be diminished.

FIGURES 3 and 4 represent enlargements of a portion of the stator and rotor of FIGURE 1. When power is applied to the field coil, stator poles of the same group, such as 30a, 30b and 30c of stator arm 13a, obtain the same polarity and the nearest opposite magnetic poles of the rotor will be pulled to the center of the stator poles. The stator poles repel the nearest rotor poles of like polarity. An arbitrary "N" polarity for the stator poles 30a . . . 30c is shown under the assumed conditions. The rotor thus moves from the position shown in FIGURE 3 to the position shown in FIGURE 4, in starting.

With opposite initial stator polarity, the starting direction would be reversed. In certain embodiments, the motor will thus start and run either in a clockwise direction or in a counterclockwise direction, depending upon the exact moment when it is energized and hence upon the phase or polarity condition of the energizing current when the motor is energized. This bi-directional characteristic is satisfactory for a number of motor applications.

If unidirectional operation of the motor is desired, any of several common mechanical "no-back" devices may be incorporated, for example, those of the camming type, of the friction-operated pawl type, or the ball type. In some cases it is desirable, in this connection, to provide some back-lash between the motor and its load to aid this no-back starting operation.

Alternatively, various non-mechanical arrangements may be employed to assure unidirectional operation.

In some motor applications where a unidirectional drive may be needed, it is satisfactory to allow the motor itself to have a bi-directional characteristic, and to interpose between the motor and the load a mechanical device of known type for converting a bi-directional drive into a unidirectional drive. For example, the bi-directional drive may be converted to oscillating motion, which, by a ratchet device, may be converted to unidirectional motion.

With a proper balance between size of the stator poles and rotor inertia, the motors of this invention can be made for operation over a wide range of voltage and load conditions.

For example, in one satisifactory motor, the width of an individual stator pole face may be about 140 degrees, but the optimum width will vary depending upon the relation desired between starting and running torque and upon other aspects of the motor design and geometry. In a typical case, where other factors remain constant, the wider the stator poles the greater is the starting torque relative to running torque, within limits.

One of many advantages of employing a design in which adjacent stator poles in a given group are of like polarity is that leakage of flux from one stator pole to the next through the intervening space is eliminated. This is in contrast to typical designs where a salient pole of one polarity is adjacent one of opposite polarity, and if they are spaced close together, flux leakage to an undesirable degree may occur.

The length of the field poles is also important in establishing maximum torque in the motors of our invention. Good starting and running torques can be achieved in the embodiment of FIGURE 1 when the stator pole faces are approximately the same axial length as the magnetized rotor face. A shorter pole length increases the air gap reluctance of the stator field flux path, which tends to weaken the stator field for a given applied voltage and decrease the effectiveness of the available rotor flux in producing torque.

During operation of the motor, magnetic flux in a given stator arm follows a path extending from its group of salient stator poles across the air gap between the stator arm and the rotor into rotor poles of one polarity, thence circumferentially of the rotor to rotor poles of opposite polarity on the side of the rotor facing the other stator arm, and thence from these rotor poles back across the air gap to the group of salient stator poles on this second arm. As the rotor magnet material in preferred embodiments is of low permeability, there is no low reluctance path across or through the rotor diametrically and thus little flux flow radially along such paths.

Since the magnetic flux generated by the energizing coil 12 is almost wholly confined to the planar stator structure and the above-described paths between its stator arms and the rotor with very little flux leakage, there is a negligible amount of flux flowing in directions parallel to the axis of rotation of the rotor. Accordingly, any axial components of torque are very small in magnitude, resulting in the important advantages of a more quiet-running motor having extended bearing life.

Whereas various illustrative embodiments of electric rotating machines have been described in the form of motors, it is to be understood that these and other embodiments of the present invention may be operated as generators, for generating alternating current, by mechanically driving the rotor 14, and deriving alternating voltage and current from the terminals 44 and 45 of the coil 12.

As previously stated, important embodiments of the motors set forth herein are capable of reliable self-starting action without requiring the use of prior art expedients such as shaded or non-symmetrical stator poles and the like. This is a significant and particularly advantageous motor characteristic which comes about because the quiescent position of the rotor is, by design, one in which individual ones of the stator poles bridge the space between adjacent magnetized regions on the rotor periphery, and the rotor consistently stops in its most favorable starting position. This most favorable starting position is, in motors of the present invention, one in which the rotor position is displaced 90 electrical degrees from one in which similar rotor poles would be centered directly opposite individual stator poles in a group. In this position each stator pole is substantially equidistant from members of a pair of rotor poles.

A detailed description of the sequence of events taking place during the starting of the motor from this preferred quiescent position of the rotor now follows:

Initially, before the power is applied, certain pairs of rotor poles straddle individual stator poles on both stator arms and the clockwise and counterclockwise magnetic forces caused by the attraction of the rotor poles for the stator poles are in equilibrium. Assume, for example, the position is as shown in FIGURE 3. (It could be a position where the rotor is shifted 180 electrical degrees from that position.)

When power is applied, the magnetic flux in the two stator pole arms varies in an alternating manner, and hence the individual stator poles in a stator arm group vary together between north pole and south pole conditions, with 180 electrical degrees difference always existing between the two stator arm groups. If the timing is such that the moment when the power is first applied corresponds approximately to the time when stator poles on a given stator arm, such as 30a . . . 30d on stator arm 13a, are just entering their north pole condition, the rotor 14 of FIGURE 3 will be urged clockwise. The rotor is able to turn far enough from dead stop in one-half a cycle of the applied power that when the flux in the respective stator arms changes direction, the rotor will be in such position that the given stator poles, now becoming of south pole polarity, again urge the rotor to continue turning in the same direction. The process is repeated successively, as the rotor continues to rotate at synchronous speed.

Assuming that the current is turned on at the instant of zero voltage, then as the voltage increases, the magnetic forces produced by the rotor tending to prevent rotation (or produce stable equilibrium) are first opposed, and then overcome, as the stator flux rises, and the rotor will start turning. As the rotor accelerates, the flux in a given stator pole reaches a maximum, and then decreases to zero, at which time the rotor pole should have reached the center of the stator pole. Note that this initial starting pulse is exerted for 180 electrical degrees, or for 1/120 of a second, whereas the rotor physically turns through a distance of only 90 electrical degrees, although it is accelerating rapidly. The fact that this distance is only one-half as great as the distance travelled when the rotor is rotating at full synchronous speed, this accounts for the ability of the rotor to start at zero speed and get into step synchronously on the first one-half cycle.

The rotor now has momentum which carries it forward, past the 90 electrical degree point of unstable equilibrium which exists because the stator pole is now producing no flux. The rotor then continues with the aid of its own positive torque, which adds to opposite flux now coming up on the second half-cycle current in the opposite direction. The rotor is now accelerated to a speed possibly even in excess of synchronous speed, so that it produces what may be a larger angle of lag than necessary to carry whatever load the motor must turn.

After some hunting for proper phase angle to balance this load (assuming, of course, that the load is constant), the rotor settles down at a synchronous speed with a slight imposed ripple caused by the 60 cycle and 120 cycle pulsing torques.

The first electrical pulse entering the stator may be any fraction of a half cycle. If this fraction is extremely small, the starting pulse delivered to the rotor will not be sufficient to accelerate it to a point where it gains sufficient momentum, and travels far enough to pass the point of unstable equilibirum before the flux again becomes zero, so that when the flux increases in opposite polarity on the subsequent one-half cycle, the rotor will be forced in the opposite direction by the rotor's own tedency to return to the original position of stable equilibrium, plus the magnetic force building up in opposite polarity on the stator pole. Thus the rotor will start in a direction determined by the polarity of the first pulse received, provided the pulse is sufficient to cause the rotor to turn past the point of unstable equilibrium, which is the point with the rotor poles directly opposed to the stator poles.

A high inertia load should preferably not be attached firmly, without blacklash, to the rotor shaft, because it will then add to the inertia of the rotor itself, and the rotor may not be able to accelerate fast enough, or travel far enough, during the first magnetic pulse, to start.

Another interesting and advantageous characteristic of motors of the present invention relates to the cooperation between (1) the torque produced by the interaction between the stator field and the rotor field and (2) the torque produced by attraction of the rotor poles for the stator poles when the stator flux is near zero. It is believed that the second of these torques, which may be referred to as the "cogging" or "de-energized" torque, is relatively strong at a time when the first of these torques is relatively weak, and that this is beneficial.

FIGURES 6 and 7 depict a second illustrative embodiment of the invention, generally similar to the embodiment of FIGURE 1 except for certain modifications of the stator structure and the rotor cover and mounting hereinafter described. Elements of this embodiment which are identical to the corresponding elements of the embodiment of FIGURE 1 are referenced with the same numerals.

The stator structure, in this embodiment, is comprised of a plurality of straight-edged stampings 41 laminated together to form a back portion encircled by the energizing coil 12. The remainder of the stator structure is formed from a unitary stamping 113 of a suitable ferromagnetic material of relatively high permeability, such as low carbon or mild silicon steel, and which has two arm portions 113a and 113b generally similar in shape to the stator arm elements 13a and 13b of the embodiment of FIGURE 1. These two arm portions 113a and 114b are joined together at their respective upper edges by a linking portion 50 of the stator structure. This linking portion 50 is designed to be of suitably small dimensional cross-section so as to readily saturate with magnetic flux when coil 12 is energized. Because of magnetic saturation, the linking portion 50 (shown in shaded detail in FIGURE 7) does not divert by shunting action any material amount of the magnetic flux which flows in the stator structure between respective salient poles 130a . . . 130d, on stator arm portion 113a, and salient poles 129a . . . 129d, on stator arm portion 113b. Thus the magnetic flux paths are essentially the same as those delineated previously in connection with the description pertaining to the motor embodiment of FIGURE 1. The linking portion 50 accordingly plays no important role in the magnetic circuit of the motor, but does, however, serve the mechanical functions of strengthening the stator structure by making it rigid and also enabling stator element 113, fabricated from a single stamping, to be secured to the stator back portion 41 without requiring any jig alignment of the stator arm portions, thus reducing the cost of manufacture of the motor assembly.

Another variation in this second embodiment of the invention is the elimination of a mounting plate for the bearing assembly 16, which is restrained instead in an annular cylinder 111b, having an end portion (not shown) through which the rotor shaft 15 projects. The cylinder 111b is press-fitted into the stator assembly and together with cap piece 111a forms a nonmagnetic protective cover housing for the rotor assembly 14.

While illustrative forms of the invention have been described in considerable detail, it will be understood that various changes may be made in the construction and arrangement without departing from the general principles and scope of the invention as defined by the appended claims.

What is claimed is:

1. A self-starting alternating current motor comprising, a non-salient cylindrical rotor mounted on a shaft and having a plurality of permanently magnetized poles of opposite polarity alternately disposed substantially equiangularly around the periphery thereof, a stator having a first and a second set of stator pole faces, said respective sets being arranged in opposing face-wise relationship and partially embracing said rotor lying there-between through respective arcs of less than 180 mechanical degrees, and means for producing an alternating field of magnetic flux in said stator such that the spacing between individual stator pole faces of the same set is an even multiple of 180 electrical degrees while the spacing between individual stator pole faces of different sets is an odd multiple of 180 electrical degrees at any given instant of time, said stator and said rotor being adopted to cause the motor to assume consistently a quiescent position in which certain pairs of adjacent rotor poles straddle individual stator pole faces of said first set and certain other pairs of adjacent rotor poles straddle individual stator pole faces of said second set, said rotor in said quiescent position being offset substantially from a position where similar rotor poles would be centered directly beneath individual stator pole faces, thereby providing said motor with a self-starting characteristic.

2. The combination set forth in claim 1 further including a cover housing of nonmagnetic material enclosing said rotor for preventing the entry of deleterious foreign matter therein.

3. A self-starting, synchronous alternating current motor comprising, a non-salient cylindrical rotor of magnetically hard material mounted on a shaft and having a plurality of permanently magnetized poles of opposite polarity alternately disposed substantially equiangularly around the periphery thereof, a stator of ferromagnetic material having a first and a second set of stator pole faces, said respective sets being arranged in opposing face-wise relationship and describing a generally circular arc, said sets of stator pole faces partially embracing said rotor centered therein with its longitudinal axis perpendicular to the plane of said arc, and an energizing coil for producing an alternating field of magnetic flux in said stator such that the spacing between individual stator pole faces of the same set is an even multiple of 180 electrical degrees while the spacing between individual stator pole faces of different sets is an odd multiple of 180 electrical degrees at any given instant of time, said stator and said rotor being adopted to cause the motor to assume consistently a quiescent position in which certain pairs of adjacent rotor poles straddle individual stator pole faces of said first set and certain other pairs of adjacent rotor poles straddle individual pole faces of said second set, said rotor in said quiescent position being offset substantially 90 electrical degrees from a position where similar rotor poles would be centered directly beneath individual stator pole faces in a set, thereby providing said motor with a self-starting characteristic.

4. A self-starting alternating current motor comprising, in combination, a stator having a first and a second group of pole faces arranged in opposing face-wise relationship on a generally circular arc, a non-salient rotor mounted on a shaft and centered inside the arc described by said stator pole faces with the longitudinal axis of said rotor being perpendicular to the plane of said arc, said rotor having a plurality of magnetic poles of opposite polarity alternately disposed substantially equiangularly around the periphery thereof, such that a given pole on said periphery of said rotor rotates past all of said first group of stator pole faces and then past all of said second group of stator pole faces, and means for producing an alternating field of magnetic flux between said groups of stator pole faces such that said flux is confined substantially in planes perpendicular to said longitudinal axis of said rotor and the spacing between individual stator pole faces of the same group is an even multiple of 180 electrical degrees while the spacing between individual stator pole faces of different groups is an odd multiple of 180 degrees at any given instant of time, said stator and said rotor being adapted to cause the motor to assume consistently a quiescent position in which certain pairs of adjacent rotor poles straddle individual stator pole faces of said first group and certain other pairs of adjacent rotor poles straddle individual stator pole faces of said second group, said rotor in said quiescent position being offset substantially from a position where similar rotor poles would be centered beneath individual stator pole faces in a group thereby providing said motor with a self-starting characteristic.

5. A self-starting alternating current motor comprising, in combination, a stator comprised of a plurality of planar laminations of C-shaped configuration having a back portion and a pair of arms which approach each other and terminate respectively in a first group of pole faces on one arm and a second group of pole faces on the other arm, the spacing between individual adjacent pole faces of a given group being M mechanical degrees, a cylindrical rotor of ferrite material mounted on a shaft centered in between said arms with its longitudinal axis perpendicular to the plane of said stator laminations, said rotor being permanently magnetized to have a plurality of magnetic poles of opposite polarity alternately disposed equiangularly about the periphery thereof with adjacent poles subtending an arc of $M/2$ mechanical degrees, such that a given pole on said periphery of said rotor rotates past all of said first group of stator pole faces on one arm and then past all of said second group of stator pole faces on said other arm, and an energizing coil encircling said back portion of said stator for producing an alternating field of magnetic flux between said groups of stator pole faces, such that said flux is confined substantially in planes perpendicular to said longitudinal axis of said rotor and parallel to said stator laminations for minimizing axial components of thrust exerted on said rotor and the spacing between individual stator pole faces of the same group is $[N][360]$ electrical degrees, where N is an integer, while the spacing between individual stator pole faces of different groups is $[N][360] \pm 180$ electrical degrees at any given instant of time, said stator and said rotor being adapted to cause the motor to assume consistently a quiescent position in which certain pairs of adjacent rotor poles straddle individual stator pole faces of said first group and certain other pairs of adjacent rotor poles straddle individual pole faces of said second group, said rotor in said quiescent position being offset substantially 90 electrical degrees from a position where similar rotor poles would be centered directly beneath individual stator pole faces in a group, thereby providing said motor with a self-starting characteristic.

6. A synchronous alternating current motor comprising, a stator of ferromagnetic material in a C-shaped configuration having a back portion and a pair of arms which approach each other and terminate respectively in a first group of pole faces on one arm and a second group of pole faces on the other arm, the spacing between individual adjacent pole faces of a given group being M mechanical degrees, a cylindrical rotor of ferrite material mounted on a shaft centered in between said arms with its longitudinal axis perpendicular to the plane of a C-shaped cross-section of said stator, said rotor being permanently magnetized to have a plurality of magnetic poles of opposite polarity alternately disposed equiangularly about the periphery thereof with adjacent poles subtending an arc of $M/2$ mechanical degrees, and an energizing coil encircling said back portion of said stator for providing an alternating magnetic flux between said respective groups of stator pole faces.

7. The combination set forth in claim 6, further including a cover housing of nonmagnetic material enclosing said rotor for preventing the entry of deleterious foreign matter therein.

8. A motor according to claim 6, wherein said rotor is adapted to be readily removed and replaced within said stator.

9. A motor according to claim 6 in which the arm containing said stator poles of said first group is connected to the arm containing said stator poles of said second group on one side thereof by a magnetically-saturable bridging portion of said stator while being separated on the other side thereof by an air gap.

References Cited by the Examiner
UNITED STATES PATENTS

| | | | |
|---|---|---|---|
| 2,317,187 | 4/1943 | Griffiths | 310—156 |
| 2,487,258 | 11/1949 | Morris | 310—176 |
| 2,606,223 | 8/1952 | Burion | 310—172 |
| 2,752,517 | 6/1956 | Von Delden | 310—163 |
| 3,059,131 | 10/1962 | Everard et al. | 310—164 |

OTHER REFERENCES

Publication in Wireless Word, December 1960, pp. 595–598.

ORIS L. RADER, *Primary Examiner.*

MILTON O. HIRSHFIELD, *Examiner.*